US006286090B1

United States Patent
Steely, Jr. et al.

(10) Patent No.: US 6,286,090 B1
(45) Date of Patent: *Sep. 4, 2001

(54) MECHANISM FOR SELECTIVELY IMPOSING INTERFERENCE ORDER BETWEEN PAGE-TABLE FETCHES AND CORRESPONDING DATA FETCHES

(75) Inventors: Simon C. Steely, Jr., Hudson, NH (US); Madhumitra Sharma, Shrewsbury; Stephen R. Van Doren, Northborough, both of MA (US); Kourosh Gharachorloo, Stanford, CA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,621

(22) Filed: May 26, 1998

(51) Int. Cl.⁷ ................................................ G06F 12/00
(52) U.S. Cl. .................... 711/207; 711/206; 711/152; 711/208; 711/154
(58) Field of Search ............................... 711/206, 203, 711/207, 211, 151, 152, 208, 154, 143, 147

(56) References Cited

U.S. PATENT DOCUMENTS

| | | | |
|---|---|---|---|
| 5,182,808 | * | 1/1993 | Bagnoli et al. ..................... 710/119 |
| 5,255,384 | * | 10/1993 | Sachs et al. ........................ 711/207 |
| 5,454,091 | * | 9/1995 | Sites et al. .......................... 711/203 |
| 5,504,900 | | 4/1996 | Raz ...................................... 707/10 |
| 5,542,062 | * | 7/1996 | Taylor et al. ......................... 711/3 |
| 5,546,582 | | 8/1996 | Brockmeyer et al. ............ 709/201 |
| 5,551,005 | | 8/1996 | Sarangdhar et al. ............. 711/145 |

OTHER PUBLICATIONS

WRL Research Report 95/7, Sep. 1995. Sarita V. Adve and Kourosh Gharachorloo, "Shared Memory Consistency Models: A Tutorial".

* cited by examiner

*Primary Examiner*—Matthew Kim
*Assistant Examiner*—Matthew D. Anderson
(74) *Attorney, Agent, or Firm*—Cesari and McKenna

(57) ABSTRACT

A technique selectively imposes inter-reference ordering between memory reference operations issued by a processor of a multiprocessor system to addresses within a page pertaining to a page table entry (PTE) that is affected by a translation buffer (TB) miss flow routine. The TB miss flow is used to retrieve information contained in the PTE for mapping a virtual address to a physical address and, subsequently, to allow retrieval of data at the mapped physical address. The PTE that is retrieved in response to a memory reference (read) operation is not loaded into the TB until a commit-signal associated with that read operation is returned to the processor. Once the PTE and associated commit-signal are returned, the processor loads the PTE into the TB so that it can be used for a subsequent read operation directed to the data at the physical address.

10 Claims, 11 Drawing Sheets

MECHANISM FOR SELECTIVELY IMPOSING INTERFERENCE ORDER BETWEEN PAGE-TABLE FETCHES AND CORRESPONDING DATA FETCHES

FIELD OF THE INVENTION

The invention relates to multiprocessor systems and, more particularly, to the efficient and selective ordering of memory reference operations issued by a processor of a multiprocessor system.

BACKGROUND OF THE INVENTION

Multiprocessor systems, such as symmetric multi-processors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in such a shared memory system between processors performing read and write operations to "synchronization variables" either before and after accesses to "data variables".

For instance, consider computer program example #1 wherein a processor P1 updates a data structure and processor P2 reads the updated structure after synchronization. Typically, this is accomplished by P1 updating data values and subsequently setting a semaphore or flag variable to indicate to P2 that the data values have been updated. P2 checks the value of the flag variable and, if set, subsequently issues read operations (requests) to retrieve the new data values. Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its memory reference operations.

Computer program example #1

| P1 | | | P2 | | |
|---|---|---|---|---|---|
| Store | Data, New-value | | L1: | Load | Flag |
| Store | Flag, 0 | | | BNZ | L1 |
| | | | | Load | Data |

The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models, such as release consistency, that may be employed.

In a sequentially consistent system, the order in which memory reference operations appear in an execution path of the program (herein referred to as the "I-stream order") is the inter-reference order. Additional instructions are not required to denote the order simply because each load or store instruction is considered ordered before its succeeding operation in the I-stream order. Consider computer program example #1 above. The program performs as expected on a sequentially consistent system because the system imposes the necessary inter-reference order. That is, P1's first store instruction is ordered before P1's store-to-flag instruction. Similarly, P2's load flag instruction is ordered before P2's load data instruction. Thus, if the system imposes the correct inter-reference ordering and P2 retrieves the value 0 for the flag, P2 will also retrieve the new value for data.

In a weakly-ordered system, an order is imposed between selected sets of memory reference operations, while other operations are considered unordered. One or more MB instructions are used to indicate the required order. In the case of an MB instruction defined by the Alpha® 21264 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB, except in specific circumstances such as when two references are directed to the same address.

Computer program example #2

| P1: | | | P2: | | |
|---|---|---|---|---|---|
| Store | Data1, New-value1 | | L1: | Load | Flag |
| Store | Data2, New-value2 | | | BNZ | L1 |
| MB | | | | MB | |
| Store | Flag, 0 | | | Load | Data1 |
| | | | | Load | Data2 |

In above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load flag; yet, there is no order required between the two post-MB loads. It can thus be appreciated that weak ordering reduces the constraints on logical ordering of memory references, thereby allowing a processor to gain higher performance by potentially executing the unordered sets concurrently.

Most computer systems use virtual memory to effectively manage physical memory of the systems. In a virtual memory system, programs use virtual addresses to address memory space allocated to them. The virtual addresses are translated to physical addresses which denote the actual locations in physical memory. A common process for managing virtual memory is to divide the virtual and physical memory into equal-sized pages. A system disk participates in the implementation of virtual memory by storing pages of the program not currently in physical memory. The loading of pages from the disk to physical memory is managed by the operating system.

When a program references an address in virtual memory, the processor calculates the corresponding main memory physical address in order to access data at that address. The processor typically includes a memory management unit that performs the translation of the virtual address to a physical address. Specifically, for each program there is a page table containing a list of mapping entries, i.e., page table entries (PTEs), which, in turn, contain the physical address of each virtual page of the program. FIG. 1 is a schematic diagram of a prior art page table 100 containing a plurality of PTEs 110. An upper portion, i.e., the virtual page number (VPN 122), of a virtual address 120 is used to index into the page table 100 to access a particular PTE 110; the PTE contains a page frame number (PFN) 112 identifying the location of the page in main memory. A lower portion, i.e., page offset 124, of the virtual address 120 is concatenated to the PFN 112 to form the physical address 130 corresponding to the virtual address. Because of its large size, the page table is generally stored in main memory; thus, every program reference to access data in the system typically requires an additional memory access to obtain the physical address, which increases the time to perform the address translation.

To reduce address translation time, a translation buffer (TB) is used to store translation maps of recently accessed virtual addresses. The TB is similar to a data cache in that the TB contains a plurality of entries, each of which includes a tag field for holding portions of the virtual address and a data field for holding a PFN; thus, the TB functions as a cache for storing most-recently-used PTEs. When the processor requires data, the virtual address is provided to the TB and, if there is a match with the contents of the tag field, the virtual address is translated into a physical address which is used to access the data cache. If there is not a match between the virtual address and contents of the tag field, a TB miss occurs. In response to the TB miss, the memory management unit fetches (from cache or memory) appropriate PTE mapping information and loads it into the TB. The read operation for the PTE is generally followed by a subsequent read or write operation for data at the mapped physical address. Handling of TB misses may be implemented in hardware or software; in the latter case, the instructions used to handle the TB miss constitute a TB miss flow routine.

In order to increase performance, modem processors do not execute memory reference instructions one at a time. In fact, it is desirable that a processor keep a large number of memory reference operations outstanding and issue, as well as complete, those operations out-of-order. This is accomplished by viewing the consistency model as a "logical order", i.e., the order in which memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, an MB instruction is typically contingent upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and, possibly, to request forwarding of the data from the owner processor to the source processor. Here the operation completes only when all probes reach their destination processors and, when required, the data is received at the source processor.

Broadly stated, these prior systems rely on completion to impose inter-reference ordering. For instance, in a weakly-ordered system employing MB instructions, all pre-MB operations must be complete before the MB is passed and post-MB operations may be considered. Completion of an operation essentially requires actual completion of all activity, including receipt of data and acknowledgments for probes, corresponding to the operation. The TB miss flow routine described above creates an inter-reference ordering issue if another processor substantially simultaneously creates the PTE that will be read during the routine. For example, consider the computer program example #3 wherein each page contains one thousand (1000) address locations.

| Computer program example #3 | |
|---|---|
| P1: | P2: |
| Write @2000, data1 | Read R1, @1000 |
| Write @2001, data2 | Read R2, @1001 |
| MB | Read R3, @2001 |
| Write PTE (2000) | Read R4, @3001 |
| | Read R5, @4002 |

Processor P1 may be performing write data operations to update the data of a page (e.g., page 2 having addresses 2000–2999) followed by an MB operation and a write PTE operation to update the mapping information in the PTE. The MB instruction imposes order such that creation of the page data is completed before creation of the map of the page so that other processors can access the page data. This creates an inter-reference ordering problem if processor P2 substantially simultaneously attempts to read an address (e.g., address 2001) of the page.

As shown in computer program example #4, P2 issues memory reference operations to addresses 1000 and 1001 until it executes the read operation to address 2001. At this point, P2 incurs a TB miss and jumps to a typical TB miss handler routine. (Note that a TB miss may be handled entirely in hardware or software and that the hardware implementation implicity performs the equivalent of an MB operation.)

Computer program example #4

P2:

Read R1, @1000
Read R2, @1001
Read R3, @2001 ----------→ TB miss flow routine

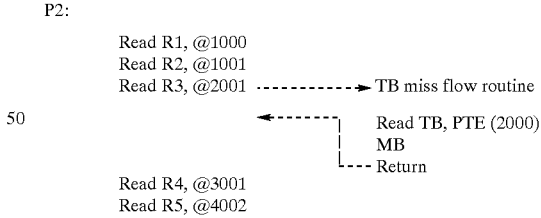

Read R4, @3001
Read R5, @4002

In the TB miss flow routine, P2 fetches the PTE corresponding to address 2001, loads it into the TB and executes the MB instruction. P2 then returns from the routine to read the data at address 2001 and, thereafter, issues read operations to addresses 3001 and 4002. The MB instruction in the TB miss flow is used to enforce inter-reference ordering between the fetch of the PTE and subsequent read/write operations to addresses within the page corresponding to the PTE. As noted, all pre-MB operations of a typical weak-ordering system can be overlapped prior to reaching the MB instruction with the only requirement being that each of the pre-MB operations complete before passing the MB instruction. Such an arrangement is inefficient and, in the context of the TB miss flow routine, adversely affects latency because the MB unnecessarily constrains references to addresses located in other pages.

SUMMARY OF THE INVENTION

The invention relates to a technique for selectively imposing inter-reference ordering between memory reference operations issued by a processor of a multiprocessor system to addresses within a page pertaining to a page table entry (PTE) that is affected by a translation buffer (TB) miss flow routine. The TB miss flow is used to retrieve information contained in the PTE for mapping a virtual address to a physical address and, subsequently, to allow retrieval of data at the mapped physical address. According to the technique, the PTE that is retrieved in response to a memory reference (read) operation is not loaded into the TB until a commit-signal associated with that operation is returned to the processor. Once the PTE and associated commit-signal are returned, the processor loads the PTE into the TB so that it can be used for a subsequent read operation directed to the data at the physical address. The inventive technique improves performance significantly over the prior arrangement of using a memory barrier (MB) instruction in the TB miss flow routine because the technique does not constrain progress of memory references to other pages.

In accordance with the invention, the commit-signal is used to order the PTE read operation with respect to the data read operation. The commit-signal is generated by control logic of the multiprocessor system to essentially facilitate inter-reference ordering; specifically, the commit-signal indicates the apparent completion of the memory reference operation for memory reference ordering purposes, rather than actual completion of the operation. It should be noted that the apparent completion of an operation occurs substantially sooner than the actual completion of an operation, thereby improving performance of the multiprocessor system.

As described herein, the multiprocessing system may comprise (i) a symmetric multiprocessing (SMP) node wherein the processor and shared memory entities are interconnected by a local switch or (ii) a SMP system wherein a plurality of nodes are interconnected by a hierarchical switch. Each processor preferably has a private cache for storing data and changes to the data as a result of the memory reference operations are reflected among the entities via the transmission of probe commands in accordance with a conventional cache coherence protocol. Notably, associated with the system is an ordering point. In the SMP node, the ordering point is associated with the local switch, whereas in the SMP system, the ordering point is associated with the hierarchical switch.

As an example of a SMP node with an ownership-based, write-invalidate cache coherence protocol, a requesting processor issues a memory reference operation to the system requesting particular data. Upon determining which entity is the owner of the data and which entities have valid copies of the data, the ordering point totally orders the memory reference operation with respect to the other issued references using, e.g., a conventional arbitration or prioritization policy. Thereafter, the ordering point generates probes to invalidate any copies of the data at appropriate processors and/or to request forwarding of the data from the owner processor to the requesting processor, as required by the memory operation. Significantly, the ordering point also generates the commit-signal at this time for transmission to the requesting processor. Probes and commit signals are generated atomically for transmission to the appropriate processors. The net result is that all memory operations appear totally ordered.

Ordering of the requested memory reference operation with respect to memory references issued by other processors of the system constitutes a commit-event for the requested operation. For the SMP node embodiment, the commit-event is the point at which the memory reference operation is ordered at the local switch, whereas for the SMP system the commit-event occurs when the memory reference operation is ordered at the hierarchical switch. The commit-signal is preferably transmitted to the requesting processor upon the occurrence of, or after, such a commit-event.

Advantageously, the invention optimizes a TB miss operation by obviating the need for an MB operation to impose inter-reference ordering between the selected memory reference operations of a TB miss flow; rather, the inventive technique specifies retrieval of the PTE via a read operation and return of a commit-signal associated with the read operation before loading the TB with the retrieved PTE. This, in turn, improves the efficiency and latency of the TB miss flow because references to addresses located in other pages are not constrained by an MB. In another aspect of the invention, a mechanism is provided for associating a commit-signal with a memory reference operation.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

The novel technique described herein may apply to a large symmetric multi-processing (SMP) system that includes a number of SMP nodes interconnected by a switch, or any similar system embodiment having a SMP node that comprises at least one processor module with a processor capable of issuing memory reference operations and system control logic for generating commit-signals in response to those issued operations. As described herein, each SMP node functions as a building block in the SMP system. The structure and operation of an SMP node embodiment that may be advantageously used with the present invention is first described, followed by a description of the SMP system embodiment.

Figure 1:
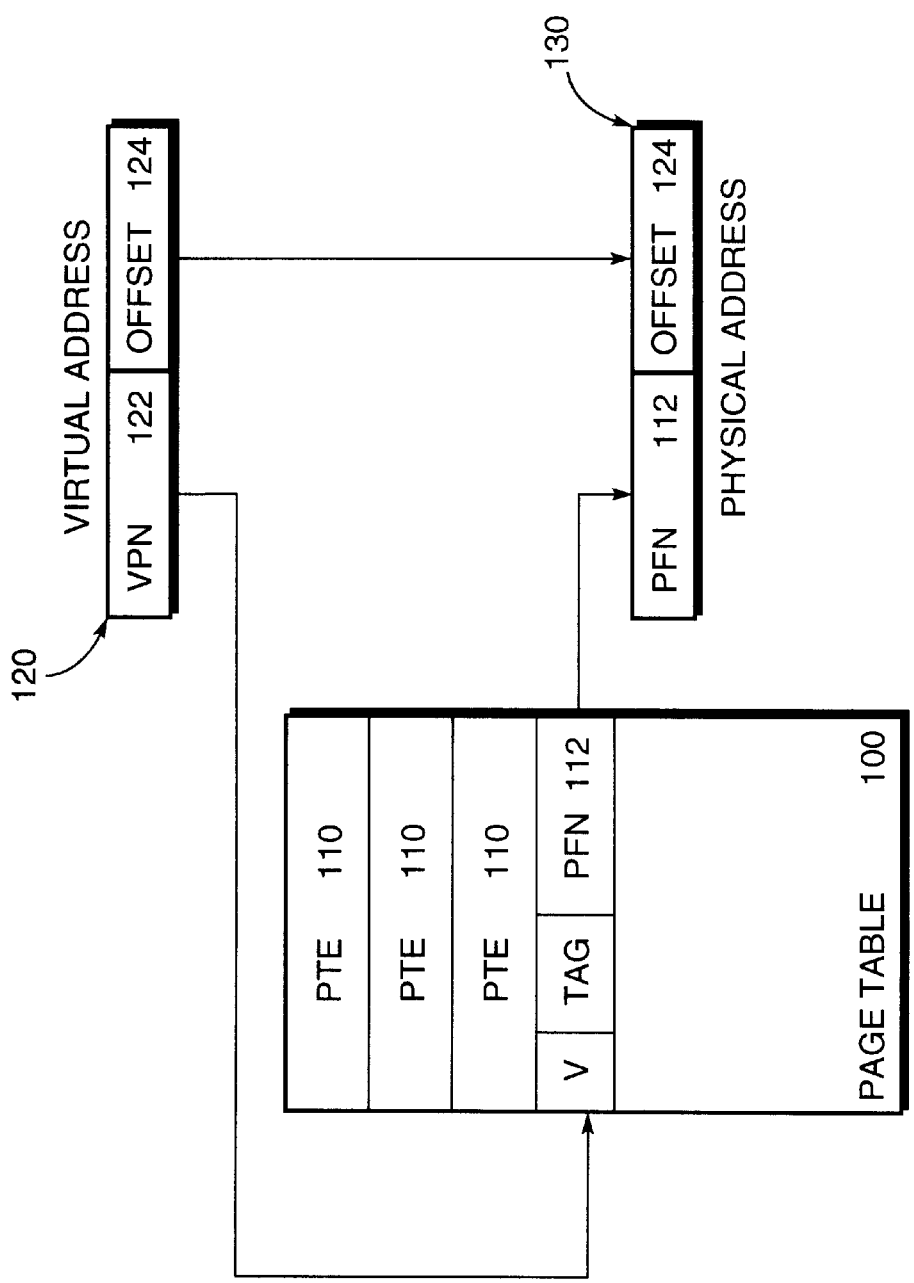
FIG. 1 is a schematic diagram of a prior art page table containing a plurality of page table entries, each of which contains information for mapping a virtual address to a physical address.
Figure 2:
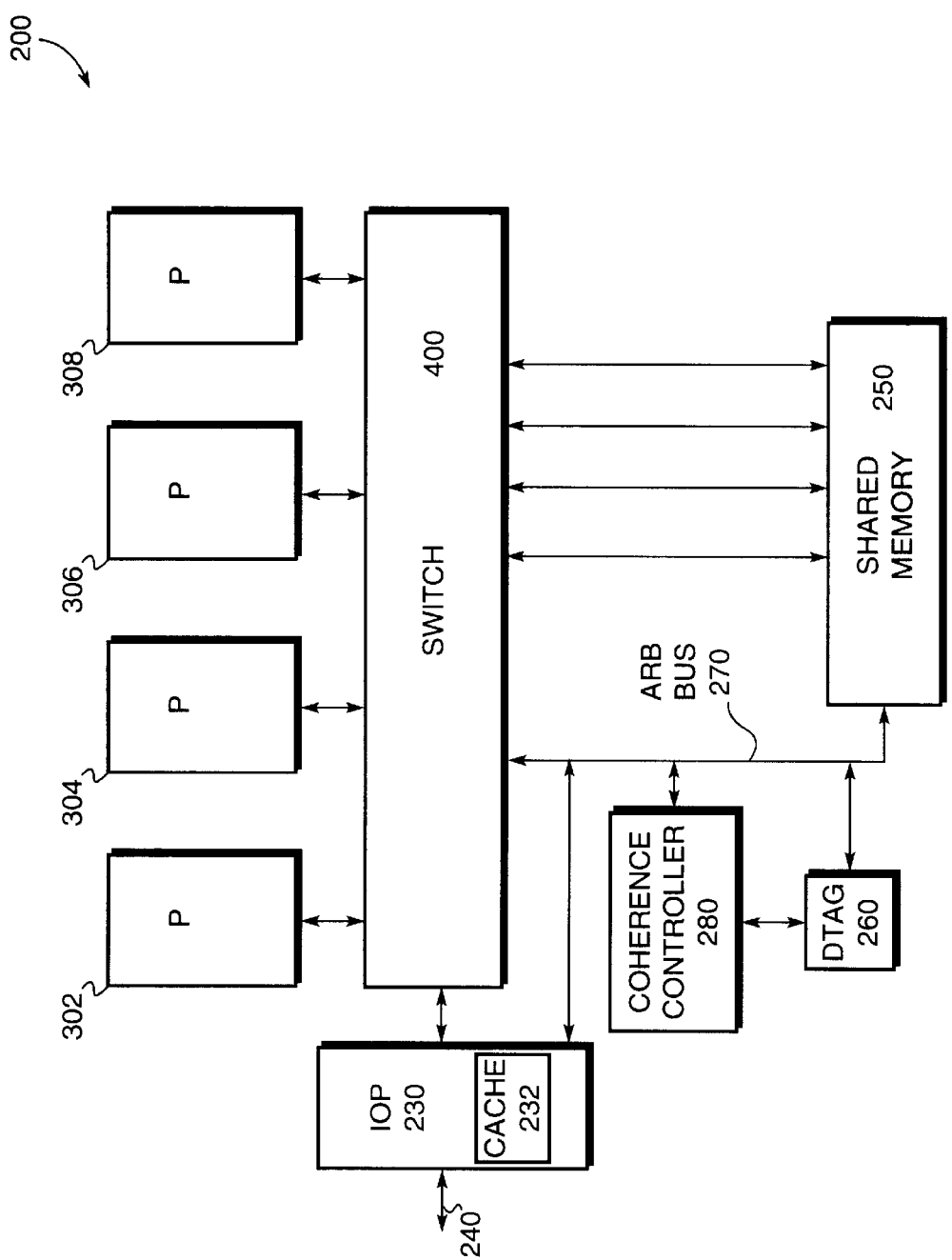
FIG. 2 is a schematic block diagram of a first multiprocessor node embodiment comprising a plurality of processor modules coupled to an input/output processor and a memory by a local switch.

SMP Node:

FIG. 2 is a schematic block diagram of a first multiprocessing system embodiment, such as a small SMP node 200, comprising a plurality of processor modules (P) 302–308 coupled to an input/output (I/O) processor 230 and a memory 250 by a local switch 400. The memory 250 comprises storage locations that are preferably organized as a single address space that is shared by the processors for storing application programs and data associated with the inventive technique described herein. The I/O processor, or IOP 230, controls the transfer of data between external devices (not shown) and the system via an I/O bus 240. Data is transferred between the components of the SMP node in the form of packets. As used herein, the term "system" refers to all components of the SMP node excluding the processors and IOP. In an embodiment of the invention, the I/O bus may operate according to the conventional Peripheral Computer Interconnect (PCI) protocol.

Figure 3:
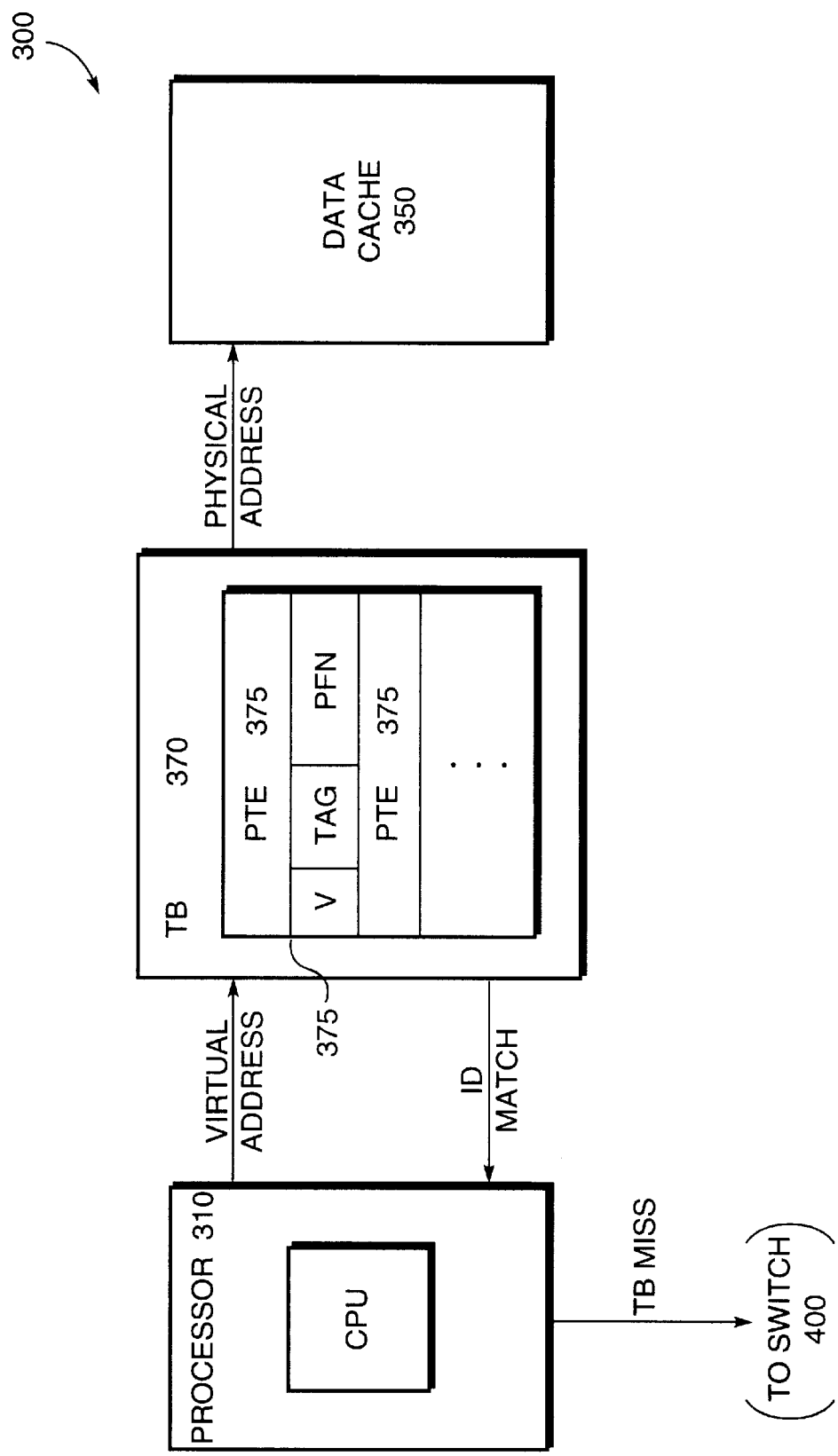
FIG. 3 is a schematic diagram of a processor module comprising at least one processor coupled to a data cache and a translation buffer.

FIG. 3 is a schematic diagram of a processor module 300 comprising at least one processor 310 coupled to a data cache 350 via a translation buffer (TB) 370. The processor 310 is a modern processor comprising a central processing unit (CPU) that preferably incorporates a traditional reduced instruction set computer (RISC) load/store architecture. In the illustrative embodiment described herein, the CPUs are Alpha® 21264 processor chips manufactured by Digital Equipment Corporations®, although other types of processor chips may be advantageously used. For example in an alternate embodiment, each processor may comprise a multi-threaded modern processor capable of executing multiple threads of instructions.

The cache 350 stores data determined likely to be accessed in the future and is preferably organized as a write-back cache apportioned into, e.g., 64-byte cache lines accessible by the processors. It should be noted, however, that other cache organizations, such as write-through caches, may be used in connection with the principles of the invention. It should be further noted that memory reference operations issued by the processors are preferably directed to a 64-byte cache line granularity. Since each processor may update data from its cache without updating shared memory 250, a cache coherence protocol is utilized to maintain consistency among the caches.

The cache coherence protocol of the illustrative embodiment is preferably a conventional write-invalidate, ownership-based protocol. "Write-Invalidate" implies that when a processor modifies a cache line, it invalidates stale copies in other processors' caches rather than updating them with the new value. The protocol is termed an "ownership protocol" because there is always an identifiable owner for a cache line, whether it is shared memory, one of the processors or the IOP entities of the system. The owner of the cache line is responsible for supplying the up-to-date value of the cache line when requested. A processor/IOP may own a cache line in one of two states: "exclusive" or "shared". If a processor has exclusive ownership of a cache line, it may update it without informing the system. Otherwise, it must inform the system and potentially invalidate copies in the other caches.

A shared data structure is provided for capturing and maintaining status information corresponding to the states of data used by the system. In the illustrative embodiment, the shared data structure is configured as a conventional duplicate tag store (DTAG) 260 that cooperates with the individual caches of the system to define the coherence protocol states of the data in the system. The protocol states of the DTAG 260 are administered by a coherence controller 280, which may be implemented as a plurality of hardware registers and combinational logic configured to produce a sequential logic circuit, such as a state machine. It should be noted, however, that other configurations of the controller and shared data structure may be advantageously used herein.

The DTAG 260, coherence controller 280, IOP 230 and shared memory 250 are interconnected by a logical bus referred to as Arb bus 270. Memory reference operations issued by the processors are routed via the local switch 400 to the Arb bus 270. The order in which the actual memory reference commands appear on the Arb bus is the order in which processors perceive the results of those commands. In accordance with this embodiment of the invention, though, the Arb bus 270 and the coherence controller 280 cooperate to provide an ordering point, as described herein.

Each application program running on the processor 310 executes in a virtual address space using virtual addresses. When a program references a virtual address in virtual memory, the processor calculates the corresponding main memory physical address using TB 370. The TB contains a plurality of page table entries (PTEs) 375, each of which includes a tag (TAG) field for holding portions of the virtual address and a data field for holding mapping information, such as a page frame number (PFN). When the processor 310 executes an instruction (such as a load/store instruction) for data, the virtual address of the instruction is provided to the TB 370 and, if there is a match with the contents of the tag field, the virtual address is translated into a physical address which is used to access the data cache 350. If there is not a match between the virtual address and contents of the tag field, a TB miss occurs.

The load/store instruction executed by the processor is issued to the system as a memory reference, e.g., read, operation in response to the TB miss. A characteristic of a modem processor is the ability to issue memory reference operations out-of-order, to have more than one memory reference outstanding at a time and to accommodate completion of the memory reference operations in arbitrary order. Each operation may comprise a series of commands (or command packets) that are exchanged between the processors and the system. The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache status updates for a specific cache line identified in the probe command. Probes include ForwardedRead (FRd) commands, ForwardedRead-Modify (FrdMod) commands and Invalidate (Inval) commands. A FRd probe is sent to a processor to obtain the current value of a cache line from its owner processor. The FRd probe causes the owner processor to return data corresponding to the cache line and to change its state for that cache line to "shared". A FrdMod probe is sent to a processor to obtain an exclusive copy of a cache line from its owner processor. The FrdMod probe causes the owner processor to return data corresponding to the cache line and to change its state for the line to "invalid". An Inval probe causes a processor to change its state for the specific cache line to "invalid".

Responses are commands from the system to processors/IOPs which carry the data requested by the processor or an acknowledgment corresponding to a request. For Rd and RdMod requests, the response is a Fill and FillMod response, respectively, each of which carries the requested data. For a CTD request, the response is a CTD-Success (Ack) or CTD-Failure (Nack) response, indicating success or failure of the CTD, whereas for a Victim request, the response is a Victim-Release response.

Figure 4:
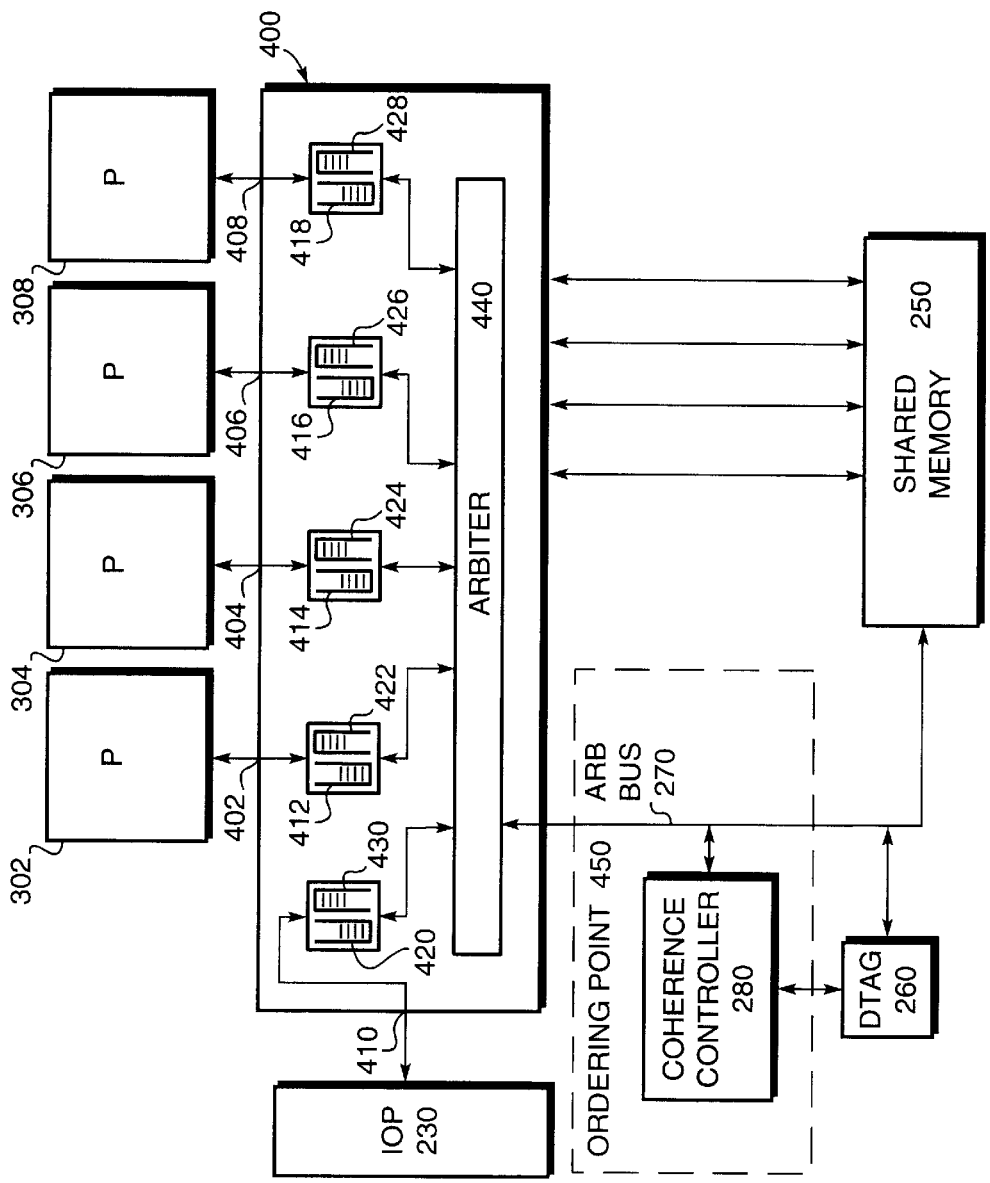
FIG. 4 is a schematic block diagram of the local switch comprising a plurality of ports coupled to the respective processor modules of FIG. 2.

FIG. 4 is a schematic block diagram of the local switch 400 comprising a plurality of ports 402–410, each of which is coupled to a respective processor module (P) 302–308 and IOP 230 via a full-duplex, bidirectional clock forwarded data link. Each port includes a respective input queue 412–420 for receiving, e.g., a memory reference request issued by its processor module and a respective output queue 422–430 for receiving, e.g., a memory reference probe issued by system control logic associated with the switch. An arbiter 440 arbitrates among the input queues to grant access to the Arb bus 270 where the requests are ordered into a memory reference request stream. In the illustrative embodiment, the arbiter selects the requests stored in the input queues for access to the bus in accordance with an arbitration policy, such as a conventional round-robin algorithm.

The following example illustrates the typical operation of multiprocessing system including switch 400. A Rd request for data item x is received at the switch 400 from the processor 310 of, e.g., processor module 302 and loaded into input queue 412. The arbiter 440 selects the request in accordance with the arbitration algorithm. Upon gaining access to the Arb bus 270, the selected request is routed to the ordering point 450 wherein the states of the corresponding cache lines are interrogated in the DTAG 260. Specifically, the coherence controller 280 examines the DTAG to determine which entity of the system "owns" the cache line and which entities have copies of the line. If a processor of module 306 is the owner of the cache line x and a processor of module 308 has a copy, the coherence controller generates the necessary probes (e.g., a Fill x and Inval x) and forwards them to the output queues 426 and 428 for transmission to the processors.

Because of operational latencies through the switch and data paths of the system, memory reference requests issued by a processor may complete out-of-order. In some cases, out-of-order completion may affect the consistency of data in the system, particularly for updates to a cache line. Memory consistency models provide formal specifications of how such updates become visible to the entities of the multiprocessor system. In a weakly-ordered system, inter-reference ordering is typically imposed by a memory barrier (MB) instruction inserted between memory reference instructions of a program executed by a processor. The MB instruction separates and groups those instructions of a program that need ordering from the rest of the instructions. The semantics of weak ordering mandate that all pre-MB memory reference operations are logically ordered before all post-MB references.

To ensure correct implementation of the consistency model, prior systems inhibit program execution past the MB instruction until actual completion of all pre-MB operations have been confirmed to the processor. Maintaining inter-reference order from all pre-MB operations to all post-MB operations typically requires acknowledgment responses and/or return data to signal completion of the pre-MB operations. The acknowledgment responses may be gathered and sent to the processor issuing the operations. The pre-MB operations are considered completed only after all responses and data are received by the requesting processor. It should be noted that the techniques described herein apply to systems employing variants of the MB instruction, such as an Instruction-MB and a Write-MB.

In the case of the TB miss described above, the processor 310 issues a read request operation to the system to acquire the appropriate PTE mapping information and load it into the TB. The read operation for the PTE is generally followed by a subsequent read operation for data at the mapped physical address. This TB miss flow sequence creates an inter-reference ordering issue if another processor substantially simultaneously creates the PTE that will be read during the TB miss flow. A prior art solution to this problem is to insert an MB instruction in the TB miss flow to enforce inter-reference ordering between the fetch of the PTE and subsequent read/write operations to addresses within the page corresponding to the PTE. (See computer program examples #3, #4.) In a typical weak-ordering system, all pre-MB operations can be overlapped prior to reaching the MB instruction with the only requirement being that each of the pre-MB operations complete before passing the MB instruction. Such an arrangement is inefficient and, in the context of the TB miss flow routine, adversely affects latency because the MB unnecessarily constrains references to addresses located in other pages.

The present invention relates to a technique for selectively imposing inter-reference ordering between memory reference operations issued by a processor to addresses within a page pertaining to a PTE that is affected by a TB miss flow routine. The TB miss flow is used to retrieve information contained in the PTE for mapping a virtual address to a physical address and, subsequently, to allow retrieval of data at the mapped physical address. According to the technique, the PTE 375 that is retrieved in response to a memory reference (read) operation is not loaded into the TB 370 until a commit-signal associated with that operation is returned to the processor.

Figure 5:
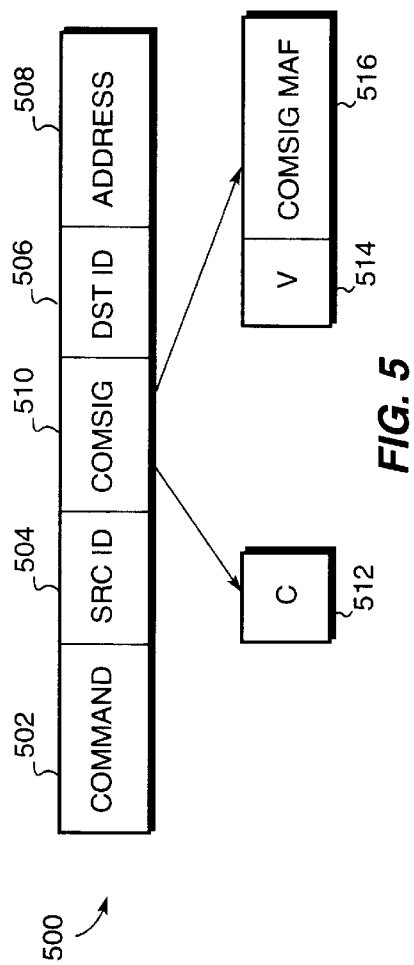
FIG. 5 is a schematic diagram of an embodiment of a commit-signal implemented as a commit-signal packet.

FIG. 5 is a schematic diagram of an embodiment of a commit-signal that is preferably implemented as a special, probe-type commit-signal packet 500. It will be apparent to those skilled in the art that the commit-signal 500 may be manifested in a variety of forms, including a discrete signal on a wire, or, in another embodiment, a packet identifying the operation corresponding to the commit-signal. In the illustrative embodiment, the commit-signal packet 500 comprises a command field 502, a source identifier (SRC ID) field 504, a destination identifier (DST ID) field 506 and an address field 508. Additionally, the packet includes a ComSig field 510 which, in one embodiment, is characterized by the assertion of a single, commit-signal ("C") bit 512 and, in another embodiment, includes a valid ("V") bit 514 and a ComSig MAF field 516 whose contents identify the corresponding operation, as described below. An example of a commit-signal that is suitable for use in the illustrative embodiment of the invention is described in copending and commonly-assigned U.S. patent application Ser. No. 08/957, 097 titled, Method and Apparatus for Reducing Latency of Inter-Reference Ordering in a Multprocessor System, which application is hereby incorporated by reference as though fully set forth herein.

Ordering point control logic 450 of the multiprocessor system generates the commit-signal 500 upon successful arbitration and access to the Arb bus 270, and total ordering of the request with respect to all memory reference requests appearing on the bus. Total ordering of each memory reference request constitutes a commit-event for the requested operation. The commit-signal 500 is preferably transmitted to the processor upon the occurrence of, or after, the commit-event. The commit-signal facilitates inter-reference ordering by indicating the apparent completion of the memory reference operation for memory reference ordering purposes, rather than actual completion of the operation.

Specifically, a commit-signal targeted to a processor P is required to stay behind any previously enqueued probes to processor P from the ordering point. However, the commit-signal may travel independent of other probes or responses resulting from the command itself. Accordingly, the commit-signal for a memory reference may arrive at the processor before, after or at the same time as the corresponding data or acknowledgement response. In practice, the commit-signal will most often arrive before or at the same time as data or acknowledgement reponses, thereby improving the performance of the multiprocessor system.

The ordering point 450 further determines the state of the data items throughout the system and generates probes (i.e., probe packets) to invalidate copies of the data (if necessary) and to request forwarding of the data from the owner to the requesting processor. In the case of the TB miss flow, a Rd request for the PTE is received at the switch 400 from the processor 310 of, e.g., module 302 and, upon gaining access to the Arb bus 270, the request is routed to the ordering point 450. The ordering point generates a FRd probe to the shared memory 250 (i.e., the owner) for the PTE; at this time, the ordering point also generates the commit-signal 500 for transmission to the processor. Note that the ordering point generates the commit-signal in response to the issued memory reference (Rd request) operation, and that the ordering point indicates the association of the commit-signal with the issued operation via the contents of the ComSig MAF field 516 and the contents of a MAF field of the operation's command packet, as described below. The commit-signal is loaded into the output queue 422 and forwarded to the processor in single, first-in, first-out (FIFO) order along with any other probes pending in the queue. As an optimization, the commit-signal may be "piggy backed" on top of one of these probe packets.

Figure 6:
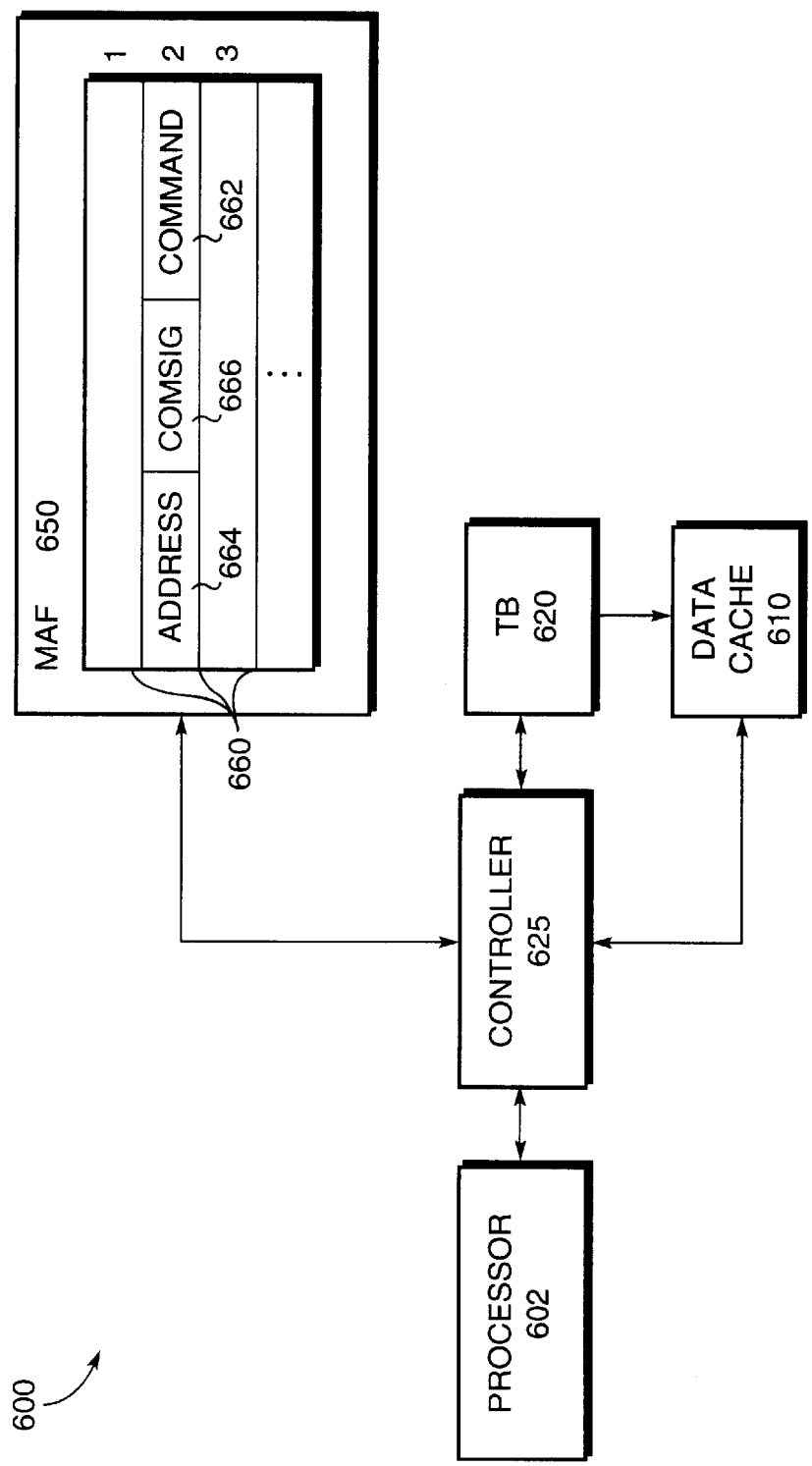
FIG. 6 is a schematic diagram of an illustrative embodiment of a processor module including a miss address file (MAF) used for implementing a novel technique for selectively imposing inter-reference ordering in accordance with the invention.

Once the PTE and associated commit-signal are returned, the processor 310 loads the PTE 375 into the TB 370 so that it can be used for a subsequent read operation directed to the data at the physical address. Thus, the commit-signal is used in connection with the inventive technique to order the PTE read operation with respect to the data read operation. In an aspect of the present invention, a mechanism is provided to associate the commit-signal with the particular memory reference (read) operation issued by the processor to obtain the PTE. FIG. 6 is a schematic diagram of an illustrative embodiment of a processor module 600 comprising a processor 602, a data cache 610, a TB 620 and a miss address file (MAF) 650 interconnected by a controller 625. In response to a TB miss and issuance of a memory reference (read) operation for an appropriate PTE, the controller 625 records the outstanding nature of the issued read operation in the MAF. In the illustrative embodiment, the MAF 650 is implemented as a table structure having a plurality of entries 660. Preferably, there is an entry in the MAF for every outstanding memory reference operation issued by the processor. Each entry 660 includes a command field 662 indicating the type of command that is outstanding and an address field 664 indicating the address of the memory reference operation. In addition, each MAF entry includes a 1-bit ComSig field 666 indicating whether a commit-signal 500 for the outstanding operation has returned to the processor. For example, the bit 666 is initially unasserted when the memory reference operation of a particular MAF entry, e.g., 2, is issued to the system. When the commit-signal associated with the operation returns to the processor, the ComSig MAF field 516 of packet 500 indicates the value 2 and the controller 625 asserts the bit of the ComSig field 666 of MAF entry 2.

Figure 7:
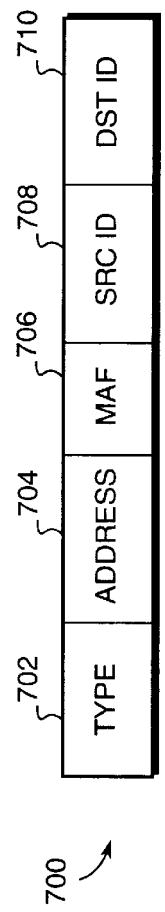
FIG. 7 is a schematic diagram of the command packet having a MAF field whose contents are used to implement the novel technique in accordance with the invention.

The read operation is issued to the system as a command packet generated by the processor 310. FIG. 7 is a schematic diagram of the command packet 700 comprising a command (type) field 702, an address field 704, a MAF field 706, a source identifier (SRC ID) field 708 and a destination identifier (DST ID) field 710. Note that there may be additional fields for other status bits that are not shown. The contents of the MAF field 706 indicate the particular MAF entry corresponding to the outstanding read operation. Continuing with the example above, the value 2 is loaded into the MAF field 706 indicating that the outstanding operation is recorded in entry 2 of the MAF 650.

In accordance with the inventive technique, if the PTE returns before the commit-signal 500 associated with the outstanding request, the PTE is not loaded into the TB 620 until the commit-signal returns and its return is noted in the MAF 650. Alternatively, the returned PTE can be immediately loaded into the TB but a valid (V) bit of the PTE (see FIG. 3 at 375) is not set until the commit-signal returns. If the commit-signal 500 arrives at the processor before the PTE, the ComSig bit 666 of the appropriate MAF entry 660 is asserted and once the PTE returns, the PTE may be immediately loaded into the TB 620. In essence, the invention ensures that the TB is not loaded with a valid PTE until both the PTE and associated commit-signal are returned.

Figure 8:
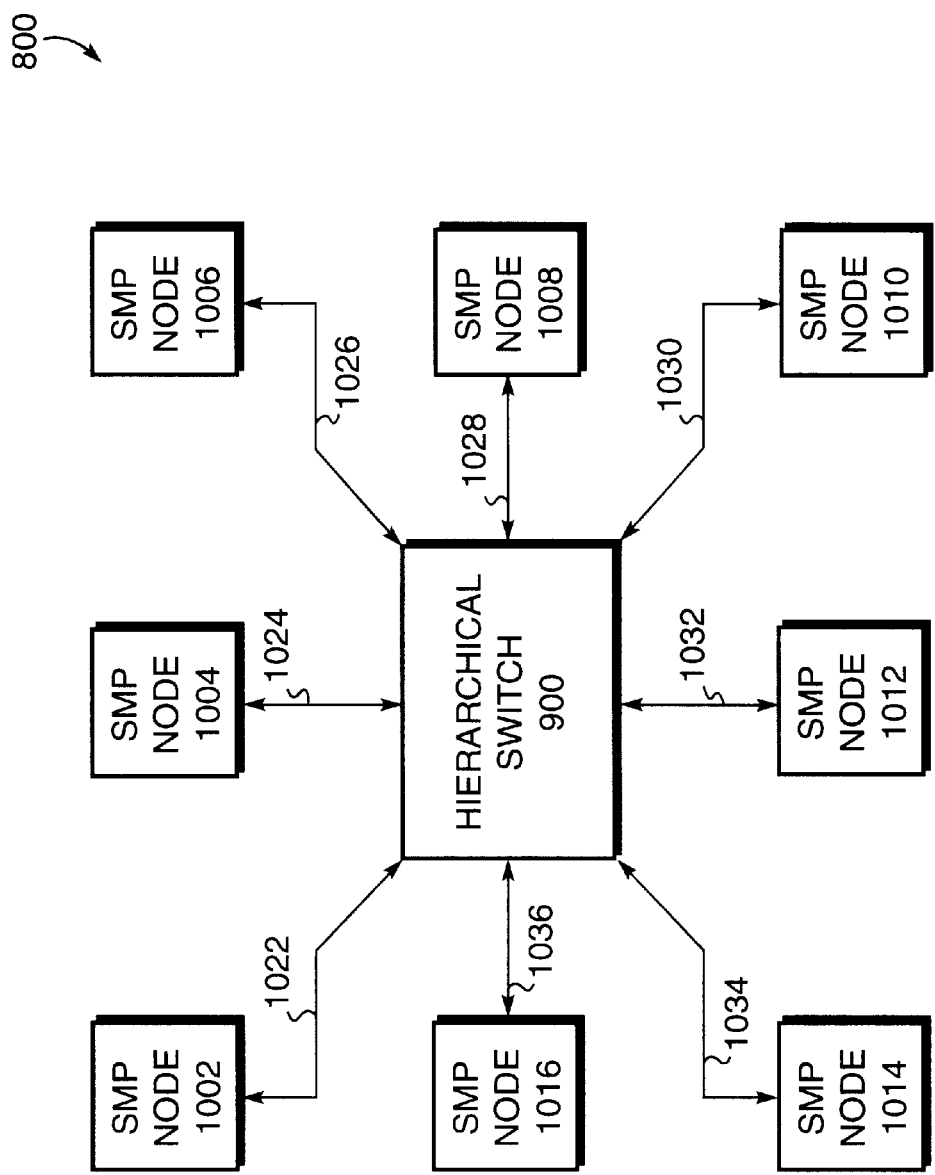
FIG. 8 is a schematic block diagram of a second multiprocessing system embodiment comprising a plurality of multiprocessor nodes interconnected by a hierarchical switch which may be advantageously used with the present invention.

SMP System:

FIG. 8 is a schematic block diagram of a second multi-processing system embodiment, such as a large SMP system 800, comprising a plurality of SMP nodes 1002–1016 interconnected by a hierarchical switch 900. Each of the nodes is coupled to the hierarchical switch by a respective full-duplex, bi-directional, clock forwarded hierarchical switch (HS) link 1022–1036. Data is transferred between the nodes in the form of packets. In order to couple to the hierarchical switch, each SMP node is augmented to include a global port interface. Also, in order to provide a distributed shared memory environment, each node is configured with an address space and a directory for that address space. The address space is generally partitioned into memory space and IO space. The processors and IOP of each node utilize private caches to store data strictly for memory-space addresses; IO space data is not cached in private caches. Thus, the cache coherency protocol employed in system 800 is concerned solely with memory space commands.

As used herein with the large SMP system embodiment, all commands originate from either a processor or an IOP, where the issuing processor or IOP is referred to as the "source processor." The address contained in a request command is referred to as the "requested address." The "home node" of the address is the node whose address space maps to the requested address. The request is termed "local" if the source processor is on the home node of the requested address; otherwise, the request is termed a "global" request. The Arb bus at the home node is termed the "home Arb bus". The "home directory" is the directory corresponding to the requested address. The home directory and memory are thus coupled to the home Arb bus for the requested address.

A memory reference operation (request) emanating from a processor or IOP is first routed to the home Arb bus. The request is routed via the local switch if the request is local; otherwise, it is considered a global request and is routed over the hierarchical switch. In this latter case, the request traverses the local switch and the GP link to the global port, passes over the HS link to the hierarchical switch, and is then forwarded over the GP link and local switch of the home node to the home Arb bus.

Figure 9:
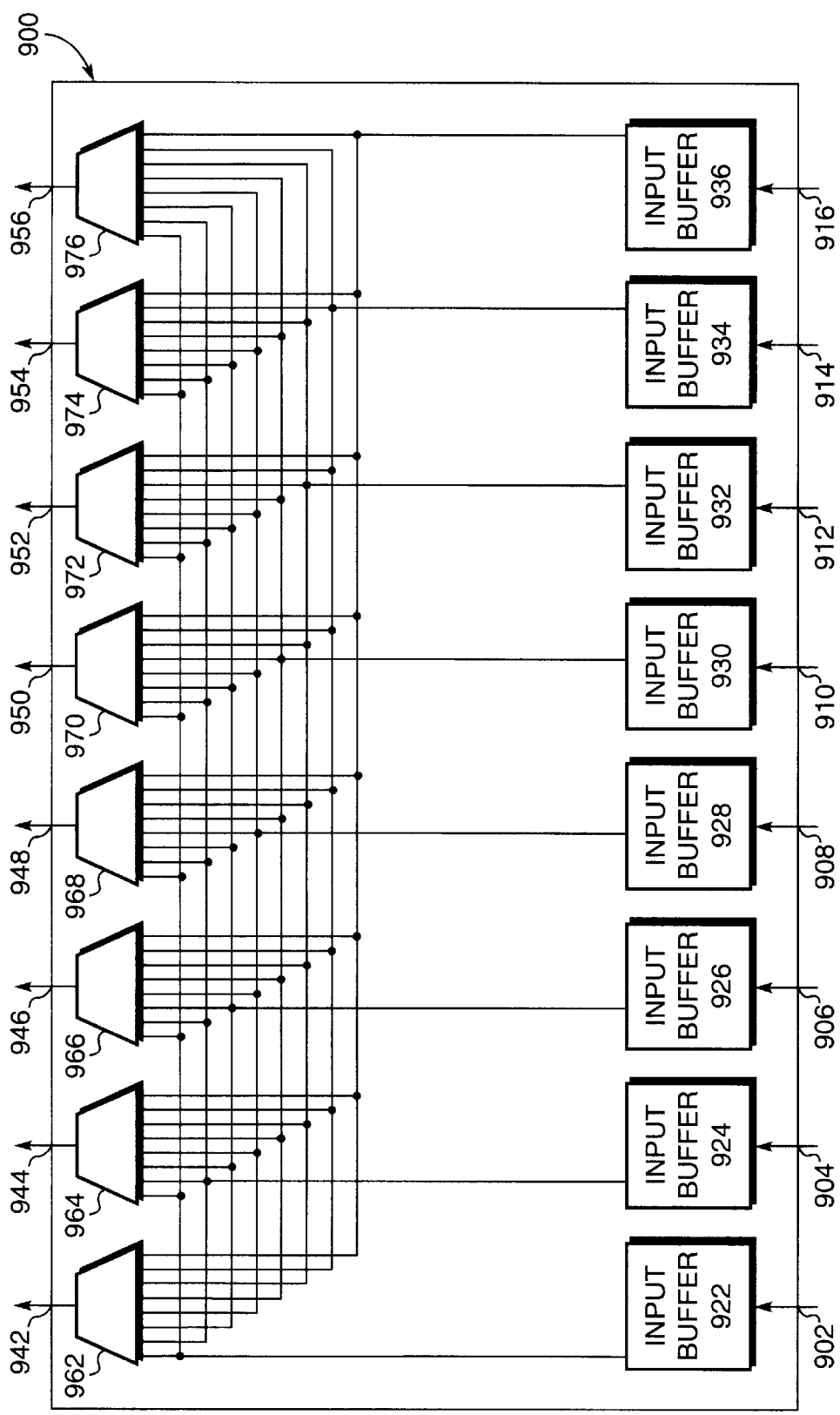
FIG. 9 is a schematic block diagram of the hierarchical switch.

FIG. 9 is a schematic block diagram of the hierarchical switch 900 comprising a plurality of input ports 902–916 and a plurality of output ports 942–956. The input ports 902–916 receive command packets from the global ports of the nodes coupled to the switch, while the output ports 942–956 forward packets to those global ports. In the illustrative embodiment of the hierarchical switch 900, associated with each input port is an input (queue) buffer 922–936 for temporarily storing the received commands. Although the drawing illustrates one buffer for each input port, buffers may be alternatively shared among any number of input ports. An example of a hierarchical switch (including the logic associated with the ports) that is suitable for use in the illustrative embodiment of the invention is described in copending and commonly-assigned U.S. patent application Ser. No. 08/957,298 titled, Order Supporting Mechanism For Use In A Switch-Based Multi-Processor System, which application is hereby incorporated by reference as though fully set forth herein.

In the large SMP system, the ordering point is associated with the hierarchical switch 900. According to the present invention, the hierarchical switch 900 is configured to support novel ordering properties in order that commit signals may be gainfully employed. The ordering properties are imposed by generally controlling the order of command packets passing through the switch. For example, command packets from any of the input buffers 922–936 may be forwarded in various specified orders to any of the output ports 942–956 via multiplexer circuits 962–976.

As described herein, the ordering properties apply to commands that contain probe components (Invals, FRds, and FRdMods); these commands are referred to as probe-type commands. One ordering property of the hierarchical switch is that it imposes an order on incoming probe-type commands. That is, the switch enqueues the commands into a logical FIFO queue based on time of arrival. For packets that arrive concurrently (in the same clock), the switch chooses an arbitrary order and places them in the FIFO queue. A second ordering property of the switch is its ability to "atomically" multicast all probe-type packets. All probe-type packets are multicast to target nodes as well as to the home node and the source node. In this context, "atomic multicast" means that for any pair of probe-type commands A and B, either all components of A appear before all components of B or vice versa. Together, these two properties result in a total ordering of all probe-type packets. The total ordering is accomplished using the input buffers in conjunction with control logic and multiplexers.

Figure 10:
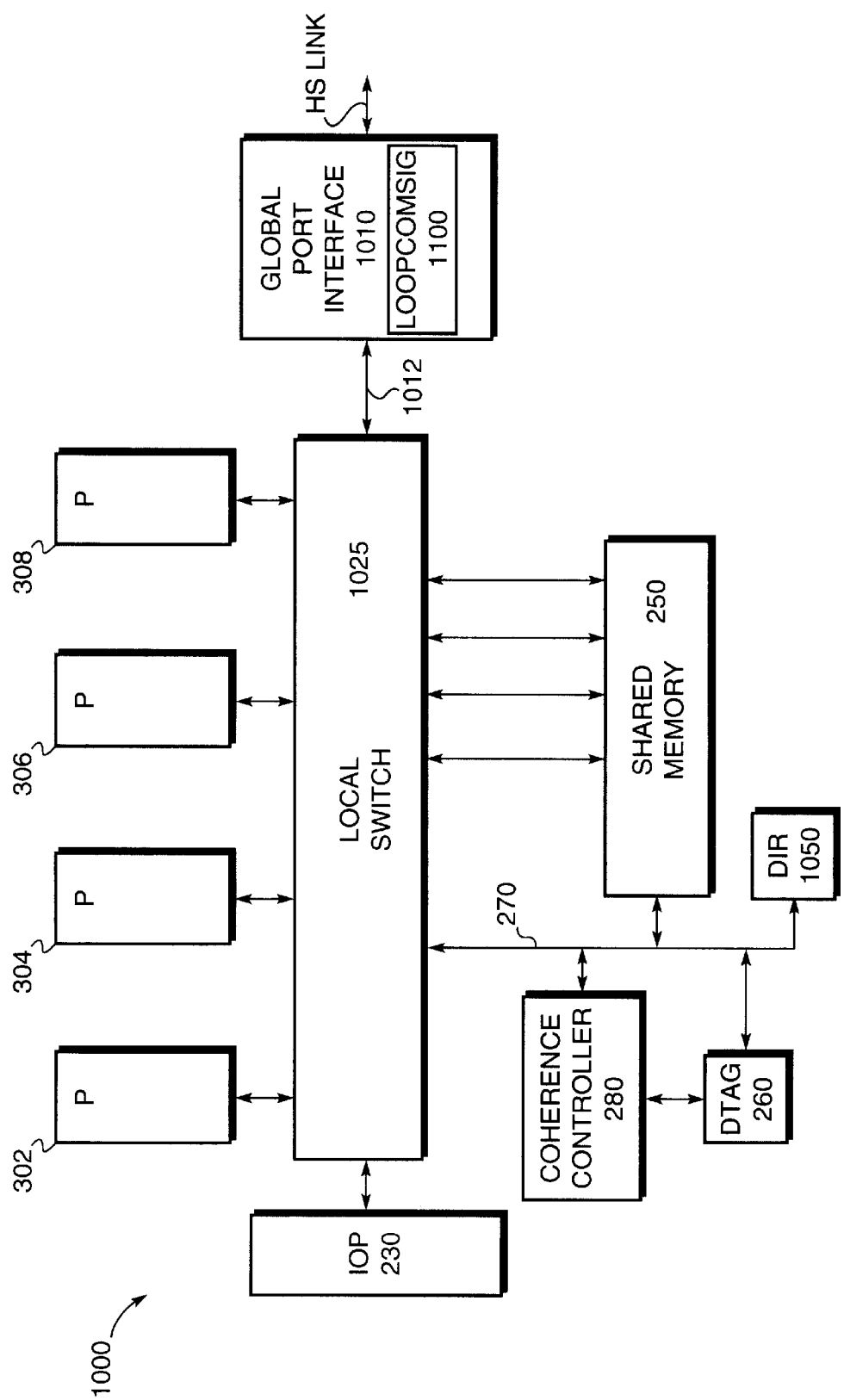
FIG. 10 is a schematic block diagram of an augmented multiprocessor node comprising a plurality of processor modules interconnected with a shared memory, an IOP and a global port interface via a local switch.

FIG. 10 is a schematic block diagram of an augmented SMP node 1000 comprising a plurality of processor modules (P) 302–308 interconnected with a shared memory 250, an IOP 230 and a global port interface 1010 via a local switch 1025. The processor, shared memory and IOP entities are similar to the those entities of FIG. 2. The local switch 1025 is augmented (with respect to switch 400) to include an additional port coupling the interface 1010 by way of a full-duplex, clock forwarded global port (GP) data link 1012. In addition to the DTAG 260, an additional shared data structure, or directory (DIR) 1050, is coupled to Arb bus 270 to administer the distributed shared memory environment of the large system 800.

The global port interface 1010 includes a loop commit-signal (LoopComSig) table 1100 for monitoring outstanding probe-type commands from the SMP node. All probe-type commands are multicast by the hierarchical switch to all target nodes as well as to the home node and the source node. The component sent to the source node serves as the commit signal whereas the one to the home node (when the home node is not the source node) serves as the probe-delivery-acknowledgment (probe-ack). In the illustrative embodiment, the LoopComSig table 1100 is implemented as a content addressable memory device, although other configurations and structures of the table may be used. Each time a probe-type command is sent to the global port, an entry is created in the LoopComSig table; when a corresponding probe-ack returns to the node's Arb bus, the entry is cleared.

In particular, the LoopComSig table is used to determine if a probe-type command corresponding to a particular address x is outstanding from the node at any specific time. This information is used to optimize the generation of commit-signals for local commands as follows: In the case of a local command appearing on the home Arb bus, if the coherence controller determines that no probe-type commands need to be sent to other nodes and if there are no outstanding probe-type commands as indicated by the Loop-ComSig table, then the commit-signal is sent directly to the source processor. In the embodiment that does not include the LoopComSig table, commit-signals for local commands always originate at the hierarchical switch. Using the Loop-ComSig table, the coherence controller is able to generate commit-signals locally and hence reduce the latency of commit-signals for a substantial fraction of local commands.

Note that although the table 1100 is physically located on the global port interface 1010, it may be logically resident on the Arb bus 270 along with the other shared data structures. The DIR, DTAG and LoopComSig table cooperate to maintain coherency of cache lines in the SMP system. That is, the DTAG captures all of the state required by the small SMP node cache coherence protocol while the DIR captures the coarse state for the large SMP system protocol; the LoopComSig table captures state information at a finer level. Each of these components interfaces with the global port interface 1010 to provide coherent communication between the SMP nodes coupled to the hierarchical switch.

Thus when a request R arrives at the home Arb bus, the DIR, DTAG and LoopComSig states are examined in order to generate probe commands to other processors and/or response commands to the source processor. Further, the states of the DIR, DTAG and LoopComSig are atomically updated to reflect the serialization of the request R. The home Arb bus may be further defined as the serialization point for all requests to a memory address. For each memory address x, store instructions appear to have been executed in the order in which their corresponding requests (RdMods or CTDs) arrive at the home Arb bus. Load instructions to address x will receive the version of x corresponding to the store x most recently serialized at the home Arb.

Figure 11:
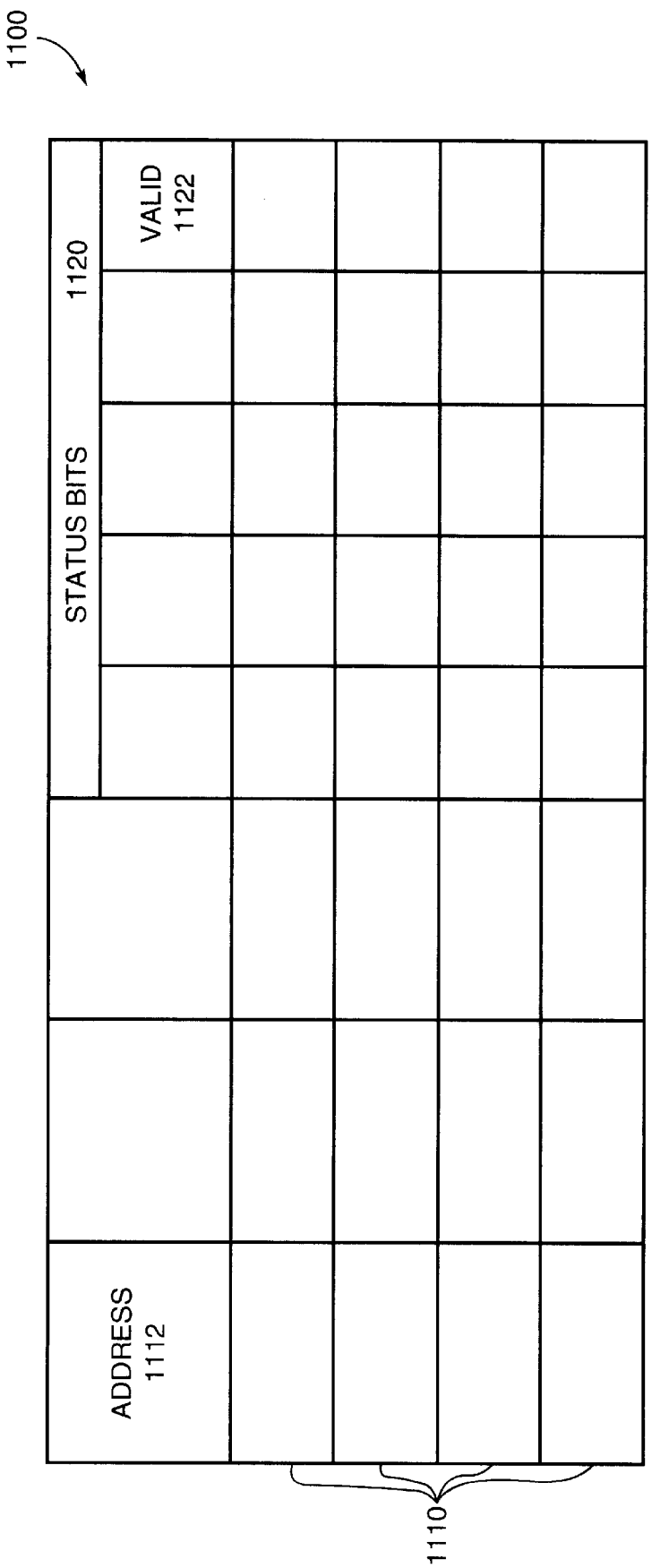
FIG. 11 illustrates an embodiment of a LoopComSig table.

FIG. 11 illustrates an embodiment of the LoopComSig table 1100 containing a plurality of entries 1110, each of which includes an address field 1112 and a number of status bits 1120. The address field 1112 stores the address of the cache line for a probe-type command that is currently outstanding. The status bits 1120 reflect the status of the outstanding command; alternatively, the status bits may be used to reflect various properties of the outstanding operation. For example, the Valid bit 1122 indicates whether the allocated entry is valid, thus denoting that this is a probe-type command with outstanding probe-acks. Note that not all of the status bits that may be included in the LoopComSig table 1100 have been shown. Rather, those status bits that have relevance to the description herein have been shown. In addition, it is envisioned that other status bits may be alternatively provided as deemed necessary to maintain memory coherency, and thus the present invention should not be limited to any particular assignment of bits in the LoopComSig table.

Referring again to FIGS. 8 and 10, the shared memory address space is preferably is distributed among the nodes and directories associated with those nodes. That is, the memory and directory of node 1002 may contain addresses 1–1000, the memory and directory for node 1004 may contain addresses 1001–2000, the memory and directory for node 1006 may contain addresses 2001–3000 and the memory and directory for node 1008 may contain addresses 3001–4000, etc. However, each processor in each node may issues commands to access data in any portion of the shared memory system. That is, the commands may be handled entirely within the node of the issuing processor (i.e., the source node) or may be transmitted to other nodes in the system based on the address and type of command.

Each processor of the system 800 may access portions of shared memory stored at its home node, or at any other SMP node. When a processor accesses (reads or writes) a shared memory cache line for which the home node is the processor's own node, the memory reference is referred to as a "local" memory reference. When the reference is to a cache line for which the home node is a node other than the processor's node, the reference is referred to as a remote or "global" memory reference. Because the latency of a local memory access differs from that of a remote memory access, the SMP system 800 is said to have a non-uniform memory access (NUMA) architecture. Further, since the system provides coherent caches, the system is often called a cache-coherent NUMA (CC-NUMA) system. In the illustrative embodiment of the invention, the large SMP system 800 is preferably referred to as a distributed shared memory system, although it may also be considered equivalent to the above classes of systems.

The shared memory system 800 disclosed herein includes several inventive aspects that contribute to its high performance and low complexity. One such aspect is its adherence to and exploitation of order among command packets exchanged throughout the system. By guaranteeing that these packets flow through the system in accordance with certain ordering properties, latencies of operations can be substantially reduced. For instance, a RdMod request does not require that Inval probes be delivered to their destination processors before the operation is considered committed; instead, the operation is considered committed as soon as a commit-signal has been delivered to the requesting processor. Furthermore, by guaranteeing that certain orders are maintained, the inventive system eliminates the need for acknowledgment responses. These probe-type commands and responses are guaranteed to reach their destinations in the order in which they are "totally ordered" within the hierarchical switch of the system and thereafter enqueued to queues of the destination nodes. These aspects of the invention improve the bandwidth of the system.

Figure 12:
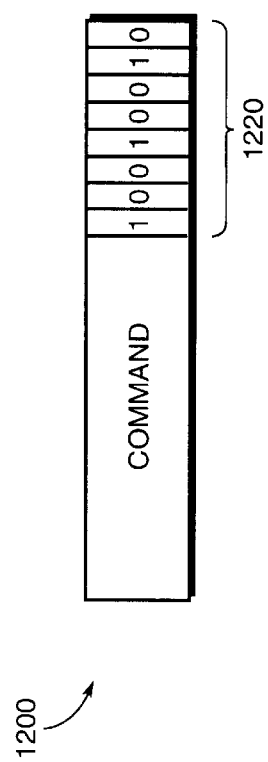
FIG. 12 is a schematic diagram of an incoming command packet embodiment modified with a multicast-vector.

Specifically, novel ordering properties of the hierarchical switch are gainfully employed to reduce the latency of inter-reference ordering and, more specifically, the latency of the inventive commit-signals. One ordering property of the hierarchical switch is that it imposes an order on incoming probe-type commands. That is, it enqueues them into a logical FIFO queue based on time of arrival. For packets that arrive concurrently (in the same clock), it picks an arbitrary order and places them in the FIFO queue. The target nodes are specified using a multicast-vector appended to the beginning of each packet. FIG. 12 is a schematic diagram of an embodiment of an incoming command packet 1200 modified with a multicast-vector 1220. The multicast-vector 1220 is basically a mask comprising a plurality of 1-bit fields, each of which corresponds to an output port of the hierarchical switch; those output ports selected to receive the incoming command packet 1200 from an input port of the switch have their respective bit fields asserted. Thus it can be appreciated that although the hierarchical switch is capable of multicasting selected incoming packets 1200, use of the appended multicast-vector 1220 may be extended to allow unicasting (by asserting only 1-bit of the multicast-vector) and broadcasting (by asserting all bits of the multicast-vector) of incoming command packets.

Figure 13:
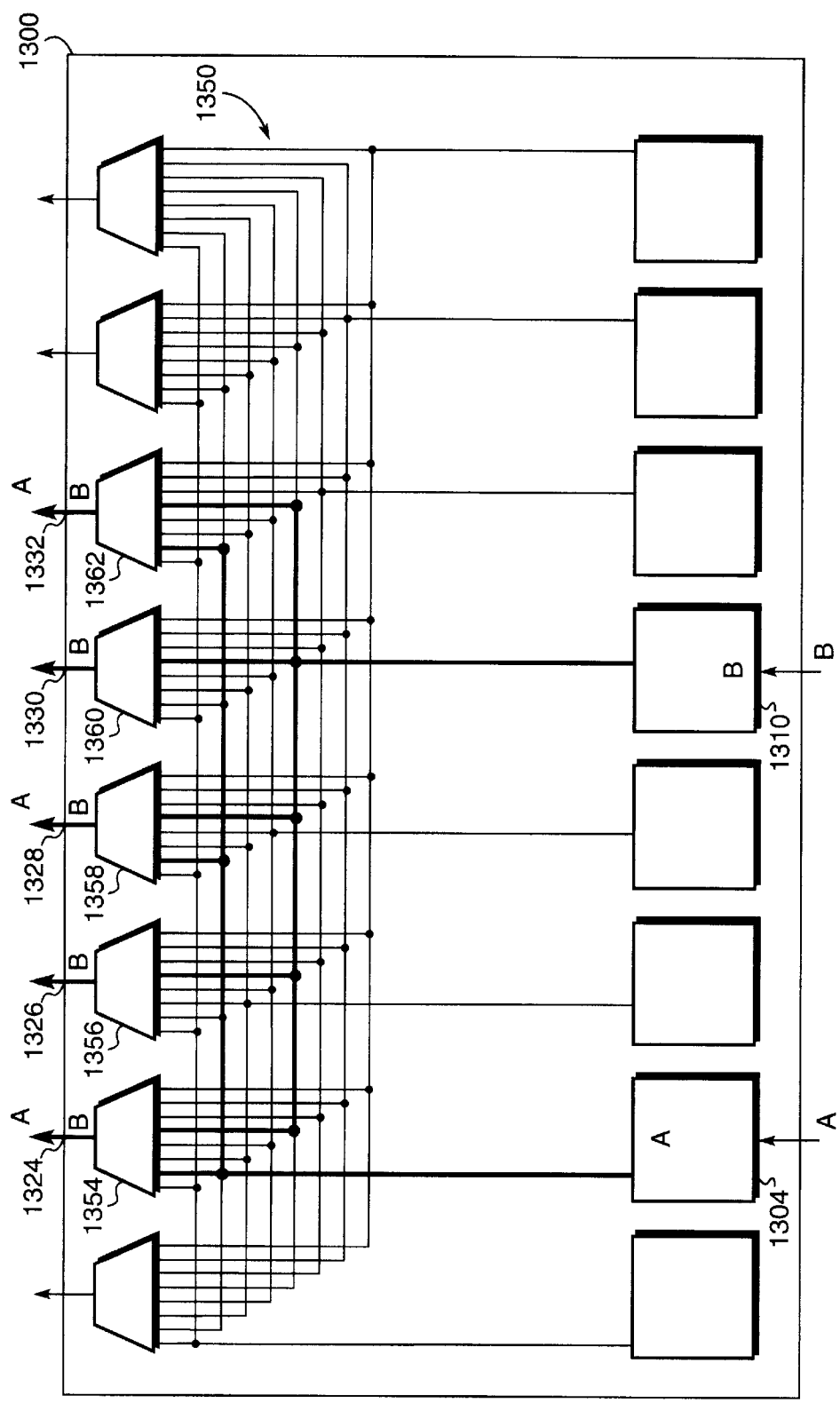
FIG. 13 is a schematic block diagram illustrating a total ordering property of an illustrative embodiment of the hierarchical switch.

A second ordering property of the hierarchical switch is that all incoming probe-type packets are "atomically" multicasted or totally ordered. That is, the hierarchical switch totally orders incoming probe-type packets such that it appears that the packets arrived in some defined order; moreover, that defined order is reflected at all nodes of the system via the output ports (and input buffers) of the switch. FIG. 13 is a schematic block diagram illustrating the total ordering property of an illustrative embodiment of the hierarchical switch 1300. Incoming command packets A, B are copied to selected output ports 1324–1332 from their respective input buffers 1304, 1310 via multiplexers 1354–1362 of the hierarchical switch as specified by their appended multicast vectors. In the illustrative embodiment, the ordering point 1350 of the switch 1300 preferably comprises the input buffers and multiplexer circuits.

In accordance with the total ordering property of the hierarchical switch, packets A and B must appear in the same order at the selected output ports as they appear in their input buffers without interleave or re-order at the different output ports. That is, the atomic nature of total ordering requires that the incoming packets appear in some defined order as determined by the hierarchical switch and that order is maintained among all of the output ports. For example, all copies of packet A are passed through the selected multiplexers 1354, 1358 and 1362, to the output ports 1324, 1328 and 1332, and then forwarded to their destinations before all copies of packet B are passed through the selected multiplexers 1354–1362 and output ports 1324–1332. In addition, none of the copies of packet A may be interleaved with copies of packet B so as to effectively destroy the ordering of the packets at the output ports. The hierarchical switch functions to essentially treat all copies of packet A before all copies of packet B (or vice-versa); whatever order is chosen, the atomic total ordering process must be followed.

In the illustrative embodiment, the switch chooses an order based on (i) the time of arrival of incoming packets at the input ports of the switch or (ii) any arbitrary prioritization policy when two or more incoming packets are received at input ports at the same time. Thus in the former case, if A is the first incoming packet received at an input port of the switch, A is the first packet ordered. In the latter case, however, if packets A and B arrive simultaneously at the switch, packet A may be totally ordered before packet B if, e.g., A was transmitted from a node having a lower node number than B. Total ordering of packets is further accomplished per clock cycle to avoid inter-ordering with packets arriving at the switch during subsequent clock cycles. Here, initial packets A and B are totally ordered during an initial clock cycle so that subsequent command packets arriving during a subsequent clock cycle cannot be ordered before those initial packets.

All probe-type commands, probe-acks, commit-signals, and victim commands is travel preferably in a FIFO order through the hierarchical switch to the Arb bus on the destination node. Implementing this rule does not require any additional hardware components; however, the rule is key. It guarantees that for any pair of memory reference operations R1 and R2, from processors P1 and P2 located anywhere in the system, if R1 is ordered before R2 by the hierarchical switch, then all probes corresponding to R1 are ahead of the commit-signal for R2. Thus, when the commit-signal for R2 reaches the source processor P2, all probes corresponding to R1 have been received by P2.

Consequently, if P2 orders another reference R3 after the receipt of the commit-signal for R2, then R3 is ordered after R1.

In summary, the novel technique described herein may apply to the large SMP system embodiment described herein, or any similar system embodiment having a SMP node that comprises at least one processor module with a processor capable of issuing memory reference operations and system control logic for generating commit-signals in response to those issued operations. More specifically, the novel technique applies to a processor having a TB that stores a plurality of PTEs. An advantage of the inventive technique involves optimization of a TB miss operation by obviating the need for a MB operation to impose inter-reference ordering between the selected memory reference operations of a TB miss flow. Instead, the inventive technique specifies retrieval of the PTE via a read operation and return of a commit-signal associated with the read operation before loading the TB with the retrieved PTE.

While there has been shown and described an illustrative embodiment for selectively imposing inter-reference ordering between memory reference operations in a multiprocessor system, it is to be understood that various other adaptations and modifications may be made within the spirit and scope of the invention. For example in alternate embodiments of the invention, configurations of the large SMP system may include any topology such as a mesh, cube, etc., each of which comprises a structure for interconnecting a plurality of small SMP nodes in a manner similar to the large SMP embodiment described herein. Moreover, the principles of the inventive technique described herein may apply to any shared memory multiprocessor system capable of generating commit-signals to selectively impose inter-reference ordering between memory reference operations.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for selectively imposing inter-reference ordering between memory reference operations of a shared memory multiprocessor system, the system having a plurality of processors, each processor having a translation buffer (TB) configured to store a plurality of page table entries (PTEs), each PTE containing information for mapping a virtual address to a physical address of a page stored in a memory of the system, the method comprising the steps of:

issuing a memory reference operation from a processor to control logic of the multiprocessor system to retrieve a PTE associated with a specific page in the memory;

generating a commit-signal at the control logic in response to the issued memory reference operation, the commit-signal being generated substantially sooner than completion of the memory reference operation and indicating apparent completion of the memory reference operation rather than actual completion of the operation;

receiving the PTE at the processor in response to the memory reference operation; and loading the received PTE into the TB only upon receipt of the commit-signal associated with the memory reference operation at the processor.

2. The method of claim 1 further comprising the step of blocking additional memory reference operations to the specific page until the TB is loaded with the received PTE.

3. The method of claim 1 further comprising the step of, wherein the commit-signal is implemented as a commit-signal packet:

associating the commit-signal with the memory reference operation using a ComSig field of the packet in conjunction with an entry of a miss address file (MAF) corresponding to the memory reference operation.

4. The method of claim 3 wherein the step of associating further comprises the steps of:

assigning the MAF entry a value; and loading the MAF entry value into the ComSig field during the step of generating the commit-signal.

5. Apparatus for selectively imposing inter-reference ordering between first and second memory reference operations issued by a processor of a shared memory multiprocessor system, the apparatus comprising:

a commit-signal structure generated by control logic of the multiprocessor system in response to the first memory reference operation issued to the system, the commit-signal structure having a mechanism for associating the commit-signal with the first memory reference operation; and a miss address file (MAF) having a plurality of MAF entries, each MAF entry corresponding to a memory reference operation issued by the processor, a first MAF entry including a field having contents that indicate whether the commit-signal associated with the first memory reference operation is received by the processor, wherein receipt of the commit-signal by the processor indicates apparent completion of the first memory reference operation.

6. The apparatus of claim 5 further comprising:

a translation buffer (TB) configured to store a plurality of page table entries (PTEs), each PTE containing information for mapping a virtual address to a physical address.

7. The apparatus of claim 6 wherein the first memory reference operation is issued to retrieve a PTE.

8. The apparatus of claim 7 wherein the retrieved PTE is loaded into the TB only upon receipt by the processor of the commit-signal associated with the first memory reference operation.

9. The apparatus of claim 8 wherein the commit-signal structure is a commit-signal packet comprising a ComSig field characterized by the assertion of a single, commit-signal bit.

10. The apparatus of claim 8 wherein the commit-signal structure is a commit-signal packet comprising a ComSig field having a valid bit and a ComSig MAF field whose contents identify the first memory reference operation.

* * * * *